(12) United States Patent
Depault (10) Patent No.: US 8,939,637 B2
(45) Date of Patent: Jan. 27, 2015

(54) APPARATUS FOR MIXING AND PUMPING MANURE SLURRIES

(76) Inventor: Marcel Depault, St-Simon-de-Bagot (CA)

( * ) Notice: Subject to any disclaimer, the term of this patent is extended or adjusted under 35 U.S.C. 154(b) by 940 days.

(21) Appl. No.: 13/082,927

(22) Filed: Apr. 8, 2011

(65) Prior Publication Data

US 2012/0257988 A1 Oct. 11, 2012

(51) Int. Cl.
| | | |
|---|---|---|
| *B01F 5/12* | (2006.01) | |
| *F04B 23/04* | (2006.01) | |
| *F04B 15/02* | (2006.01) | |
| *F04B 41/06* | (2006.01) | |

(52) U.S. Cl.
CPC ............... *F04B 15/02* (2013.01); *F04B 23/04* (2013.01); *F04B 41/06* (2013.01); *Y10S 417/90* (2013.01)
USPC ............ 366/270; 366/285; 417/231; 417/900

(58) Field of Classification Search
CPC .... B01F 7/00341; B01F 7/00733; B01F 7/22; B01F 7/06; B01F 2215/0003; F04B 15/02; F04B 23/04; F04B 41/06
USPC ......... 366/261–266, 270, 285, 292, 342, 343, 366/345; 417/62, 361, 231, 900
See application file for complete search history.

(56) References Cited

U.S. PATENT DOCUMENTS

| | | | | | |
|---|---|---|---|---|---|
| 2,214,677 | A | * | 9/1940 | North | 417/231 |
| 3,778,233 | A | * | 12/1973 | Blough et al. | 422/225 |
| 4,406,413 | A | * | 9/1983 | Houle | 241/46.04 |
| 4,441,824 | A | * | 4/1984 | Brokaw | 366/266 |
| 4,555,063 | A | * | 11/1985 | Goettsch | 241/46.04 |
| 4,594,006 | A | * | 6/1986 | Depeault | 366/266 |
| 4,661,046 | A | | 4/1987 | Ruyle | |
| 4,685,868 | A | * | 8/1987 | Bodensteiner et al. | 417/405 |
| 4,836,687 | A | * | 6/1989 | Kardoes et al. | 366/286 |
| 5,100,303 | A | * | 3/1992 | Depault | 417/361 |
| 5,364,233 | A | * | 11/1994 | Benoit | 417/231 |
| 5,624,241 | A | | 4/1997 | Nesseth | |
| 6,988,874 | B2 | * | 1/2006 | Spargo | 417/234 |
| 7,028,992 | B2 | * | 4/2006 | Rajendren | 261/28 |
| 8,007,249 | B2 | * | 8/2011 | Spargo | 417/231 |
| 2008/0317606 | A1 | * | 12/2008 | Spargo | 417/231 |
| 2012/0257988 | A1 | * | 10/2012 | Depault | 417/62 |

FOREIGN PATENT DOCUMENTS

| | | | | | |
|---|---|---|---|---|---|
| AT | | 241276 | B | * | 7/1965 |
| CA | | 1126257 | A1 | * | 6/1982 |
| EP | | 0055596 | | * | 7/1982 |
| GB | | 875080 | A | * | 9/1984 |
| JP | | 59166231 | A | * | 9/1984 ............... B01F 3/08 |

* cited by examiner

*Primary Examiner* — Charles Cooley
(74) *Attorney, Agent, or Firm* — Norton Rose Fulbright Canada LLP (57) ABSTRACT

An apparatus for mixing and pumping manure slurry from a manure pit comprises a pump unit having first and second mixing rotors and a pumping rotor. In operation, the first mixing rotor draws solids downwardly towards the pump unit while the second mixing rotor redirect a portion of the solids drawn by the first mixing rotor away from the pump unit, thereby allowing to control the ration of solid contents in the slurry pumped by the pumping rotor. A non-diverted flow distribution arrangement is also provided for selectively connecting the pump outlet in straight-through flow connection with either a drainage pipe or a re-circulation pipe.

10 Claims, 7 Drawing Sheets

FIG. 1

FIG_3

APPARATUS FOR MIXING AND PUMPING MANURE SLURRIES

TECHNICAL FIELD

The present application relates to an apparatus for mixing and pumping slurries from manure pits or lagoons in which animal manure is collected.

BACKGROUND ART

Farm animal manure is a slurry containing liquids and solids in suspension. Such manure must be held in holding reservoirs near a barn such as in-ground tanks or lagoons, commonly referred to as manure pits. A by-product of keeping animal manure is that it can, when required, be spread by suitable spreaders on fields as a fertilizer. The apparatus for spreading the manure normally comprises a closed tank mounted on a vehicle and communicating with a spreader. When required, the manure in the holding reservoir must be transferred into the spreading tanks by suitable pumps.

However, the manure in the holding reservoir tends to separate and the solids may settle to form a thick layer at the bottom of the reservoir and may also form a thick solid crust on the surface of the liquids. Such crust has a consistency of dry peat moss and must therefore be broken up before it can be mixed with the liquid into a "pumpable" slurry and be transferred from the reservoir into the spreading apparatus. It is necessary, therefore, to provide an apparatus for both mixing the solids and forming a slurry with the liquids in the reservoir as well as to have a pumping apparatus for pumping the so-formed slurry into the tank for the spreading apparatus.

The inventor has obtained U.S. Pat. No. 4,594,006 issued on Jun. 10, 1986 and U.S. Pat. No. 5,100,303 issued on Mar. 31, 1992, both of which are herein incorporated by reference, relating to a manure pump for mixing and pumping manure pits. As described in the above-mentioned patents, opposed first and second impellers are provided for drawing solids and liquids towards the pump. The ratio of solids relative to the liquids being pump may in some instances be too important to provide for the formation of an easily "pumpable" slurry, thereby requiring longer mixing operations.

While the apparatuses described in the above patents have proven to be efficient, the breaking up of the crust and other solid contents and the mixing thereof with the liquid contents remain time consuming.

Also conventional mixing and pumping apparatus also typically comprises a valve for selectively connecting the outlet of the pump in flow communication with either a drainage pipe or a re-circulation pipe. The valve is operational to divert the incoming flow to a selected one of the pipes. Under certain operation conditions, such flow deviation may result in clogging problems.

There is thus a need for a new apparatus for mixing and pumping manure slurries.

SUMMARY

Therefore, in accordance with a general aspect, there is provided an apparatus for mixing and pumping manure slurry from a manure pit, the apparatus comprising: a pump unit adapted to be positioned within the manure pit, the pump unit having top, bottom and lateral faces; a first bladed rotor projecting from said top face of the pump unit for creating a downward flow of slurry and drawing solids downwardly against the pump unit; a second bladed rotor provided on the bottom face of the pump unit for drawing liquids upwardly from a bottom portion of the manure pit; and a third bladed rotor projecting from one of the lateral faces of the pump unit between the top and bottom faces thereof for redirecting a portion of the flow of solids drawn by the first bladed rotor away from the pump unit.

In accordance with another aspect, there is provided an apparatus for mixing and pumping manure slurry from a manure pit, comprising a pump unit adapted to be displaced in the manure pit for mixing and pumping the manure slurry, the pump unit having a pump outlet for discharging the manure slurry being pumped from the pump unit, and a distribution arrangement for selectively connecting the pump outlet to a selected one of a drainage and a re-circulation pipe, the distribution arrangement having a support having first and second inlets respectively connected to the drainage and re-circulation pipes; a distribution member mounted on one side of the support for relative movement with respect thereto, the distribution member having an outlet defined therein, the outlet being connected in flow communication with the pump outlet; and an actuator for displacing the distribution member from a first position in which the outlet of the distribution member is positioned in registry with the first inlet to provide a straight-through flow path from the outlet to the first inlet, and a second position in which the outlet of the distribution member is positioned in registry with the second inlet of the support to provide a straight-through flow path from the outlet to the second inlet.

DESCRIPTION OF THE PREFERRED EMBODIMENTS

Figure 1:
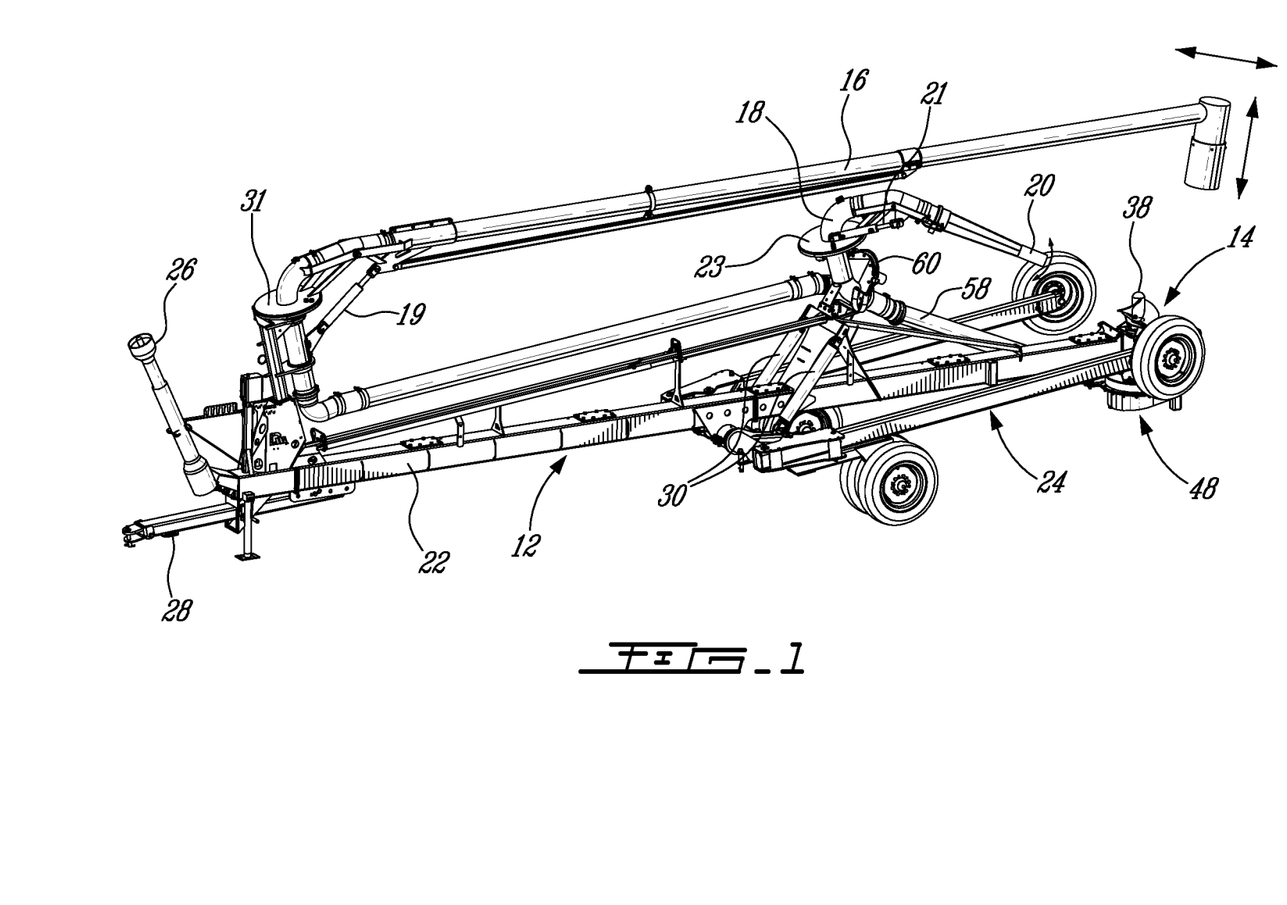
FIG. 1 is a perspective view of an apparatus for mixing and pumping manure slurry from a manure pit.
Figure 5:
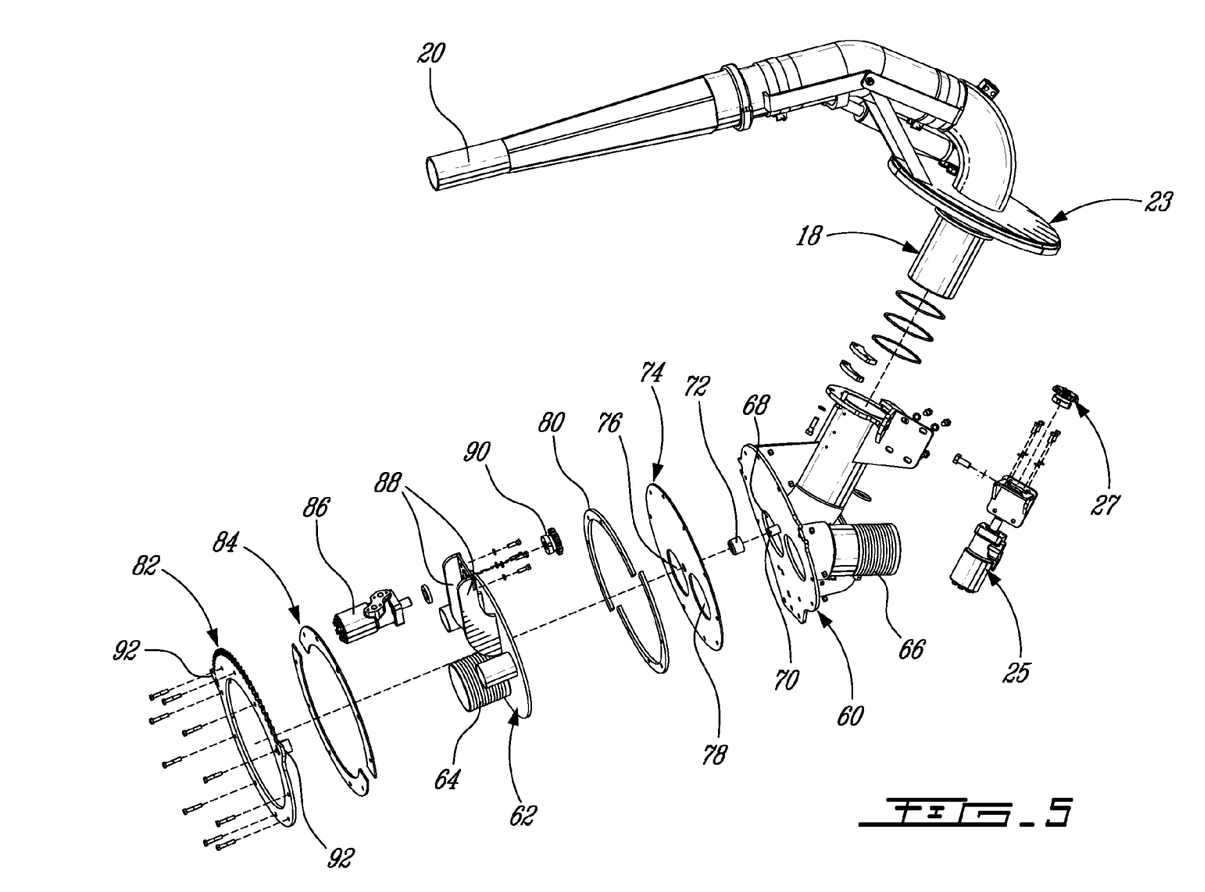
FIG. 5 is an exploded perspective view of a flow distribution unit of the apparatus shown in FIG. 1.
Figure 7:
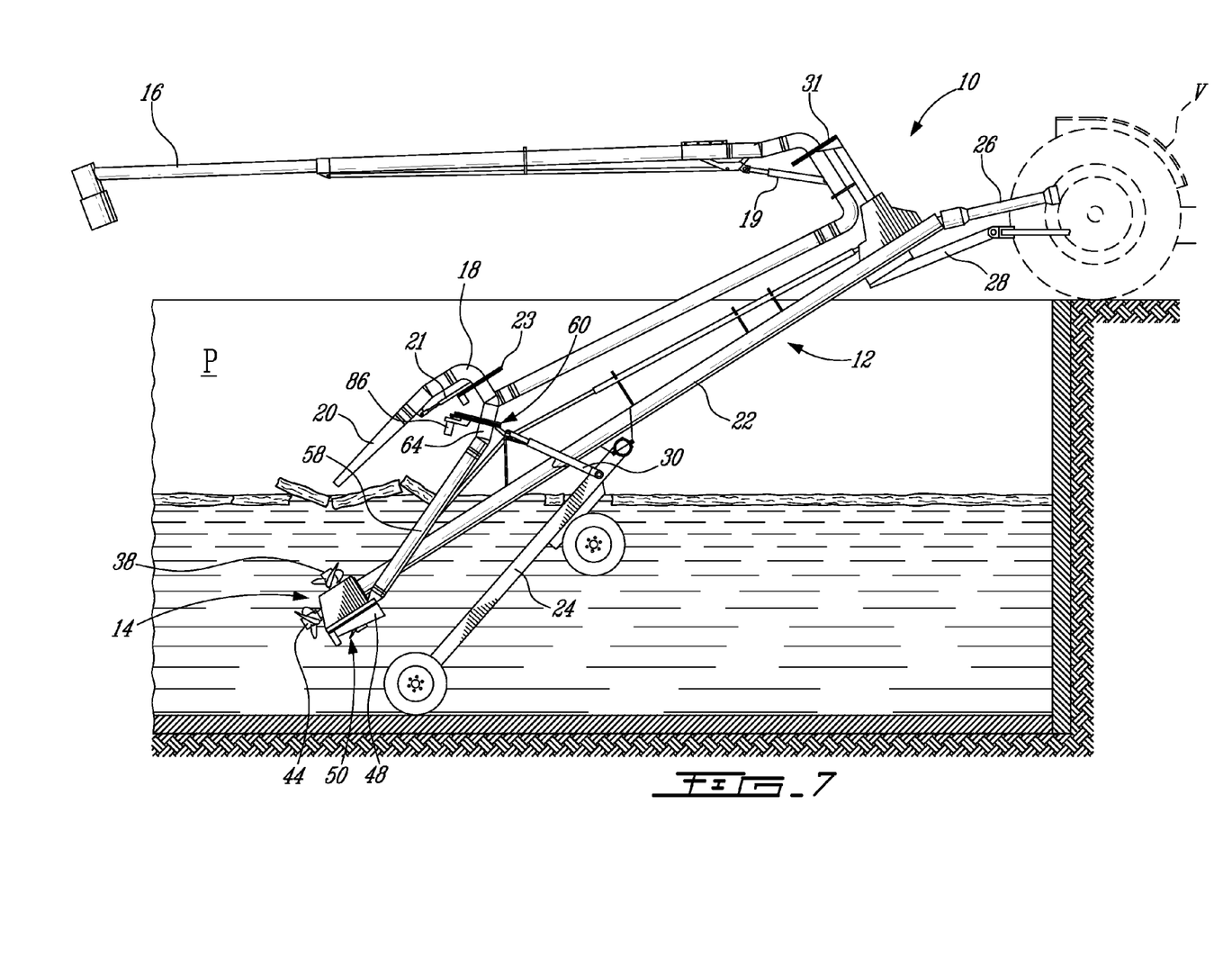
FIG. 7 is a schematic side elevation view of the apparatus shown in a functional position for mixing and pumping manure slurry in a manure pit.

FIGS. 1 and 7 illustrate an apparatus 10 suited for mixing solids and liquids contained in a manure pit P (FIG. 7) into a slurry and for then pumping the manure slurry into a tank of a spreader (not shown). The apparatus 10 has an elongated frame 12 carrying at a rear end thereof a pump unit 14. The pump unit 14 is adapted to be selectively connected in fluid flow communication with an extendable drainage pipe 16 for directing the manure slurry from the manure pit P into the tank of the spreader once the mixing operation has been completed or to an articulated recirculation pipe 18 having a jet nozzle 20 mounted at the distal end thereof for re-directing the liquid pumped from the manure pit P into the slurry that is being formed during the mixing operation. The jet can advantageously be used to break up the crust formed at the surface of the manure. As shown in FIG. 1, pipes 16 and 18 are both articulated and supported by the frame 12. Actuators, such as hydraulic cylinders 19 and 21, may be provided for laterally and/or vertically pivoting the pipes 16 and 18 relative to the frame 12. As shown in FIG. 5, a power-operated turntable 23 may be provided for changing the orientation of the nozzle 20. For instance, the turntable 23 could be powered by a hydraulic motor 25 driving a pinion 27 mounted in meshing engagement with the turntable 23. A similar turntable mechanism 31 may be provided for rotating the drainage pipe 16. Flexible pipe sections may be provided at strategic locations along the pipes 16 and 18 to facilitate movement thereof. The pipes 16 and 18 or sections thereof may be provided in the form of semi-rigid flexible hose-like members that can be bent along their longitudinal ends.

Figure 2:
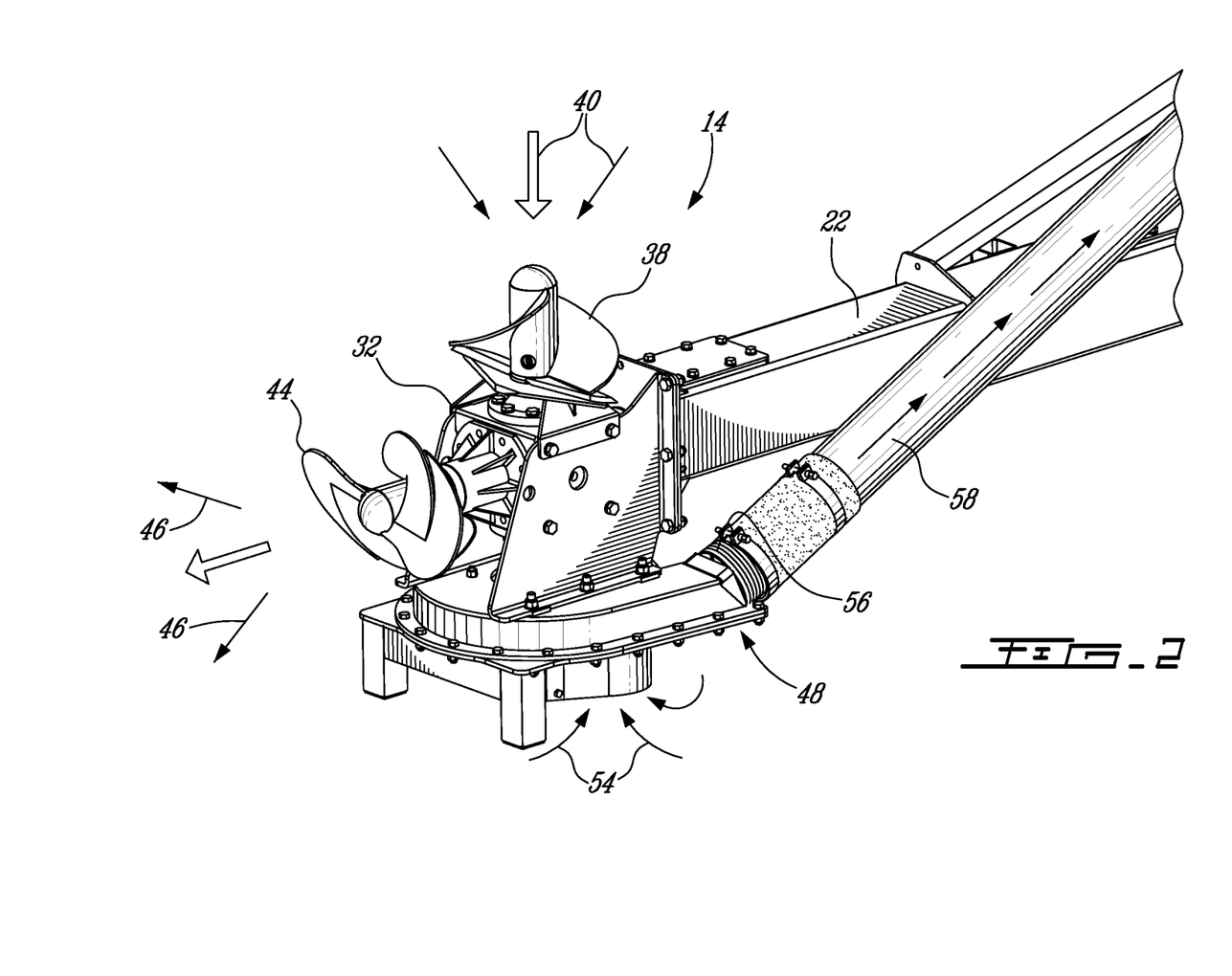
FIG. 2 is an enlarged perspective view of the pump unit of the apparatus shown in FIG. 1.
Figure 4:
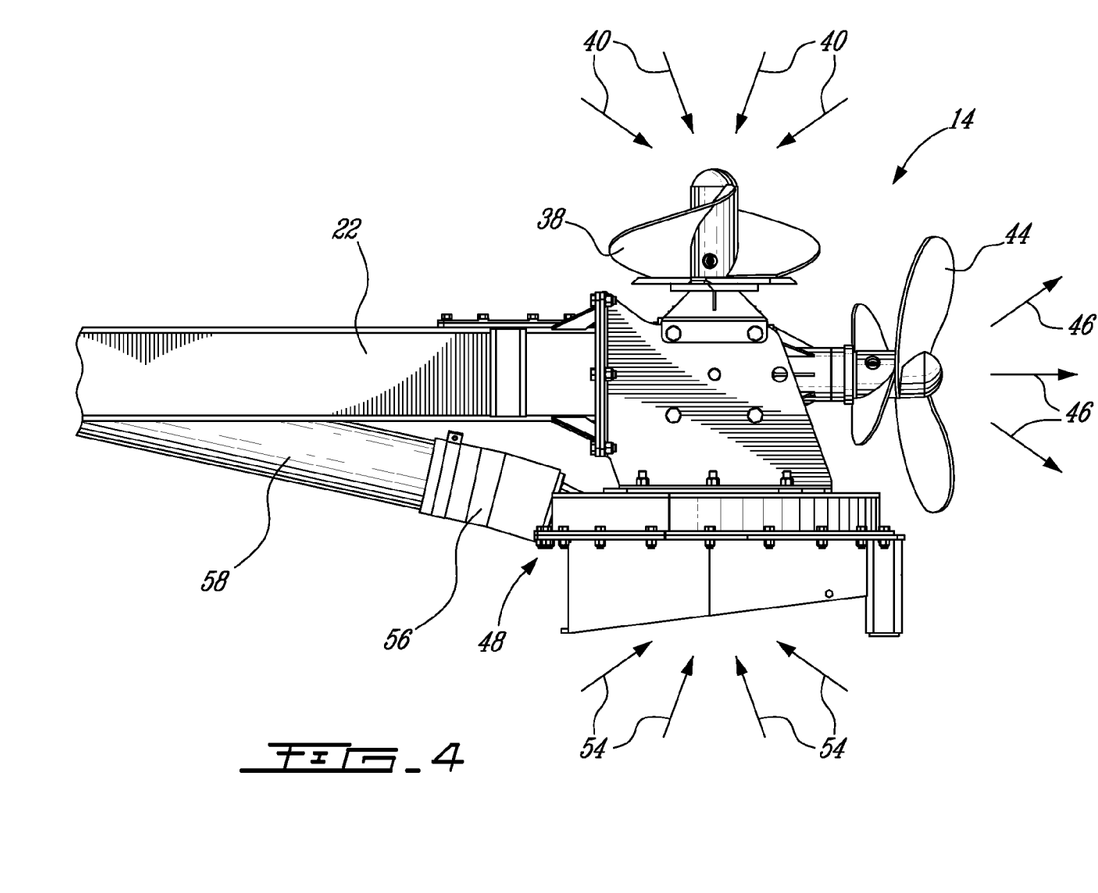
FIG. 4 is a side view of the pump unit.

The frame 12 comprises a central tubular beam 22 housing a drive shaft (not shown) adapted to be connected to a drive source via a drive connection 26 for driving the pump unit 14. For instance, the drive connection 26 could be connected to the power take-off of a motive vehicle, such as a tractor V (FIG. 7). As shown in FIGS. 2 and 4, the pump unit 14 may be bolted or otherwise suitably mounted to the distal end of beam 22. Referring back to FIG. 1, it can be seen that the central tubular beam 22 is in turn pivotally mounted to a U-shaped wheeled carriage or sub-frame 24 for allowing the apparatus 10 to be transported from one site to another. The frame 12 may be provided at a front end thereof with a hitch 28 for connection to the draw bar of the tractor V (FIG. 7). A pair of hydraulic cylinders 30 or other suitable actuators may be provided between the frame 12 and the sub-frame 24 in order to pivot the sub-frame 24 relative to the frame 12.

Figure 3:
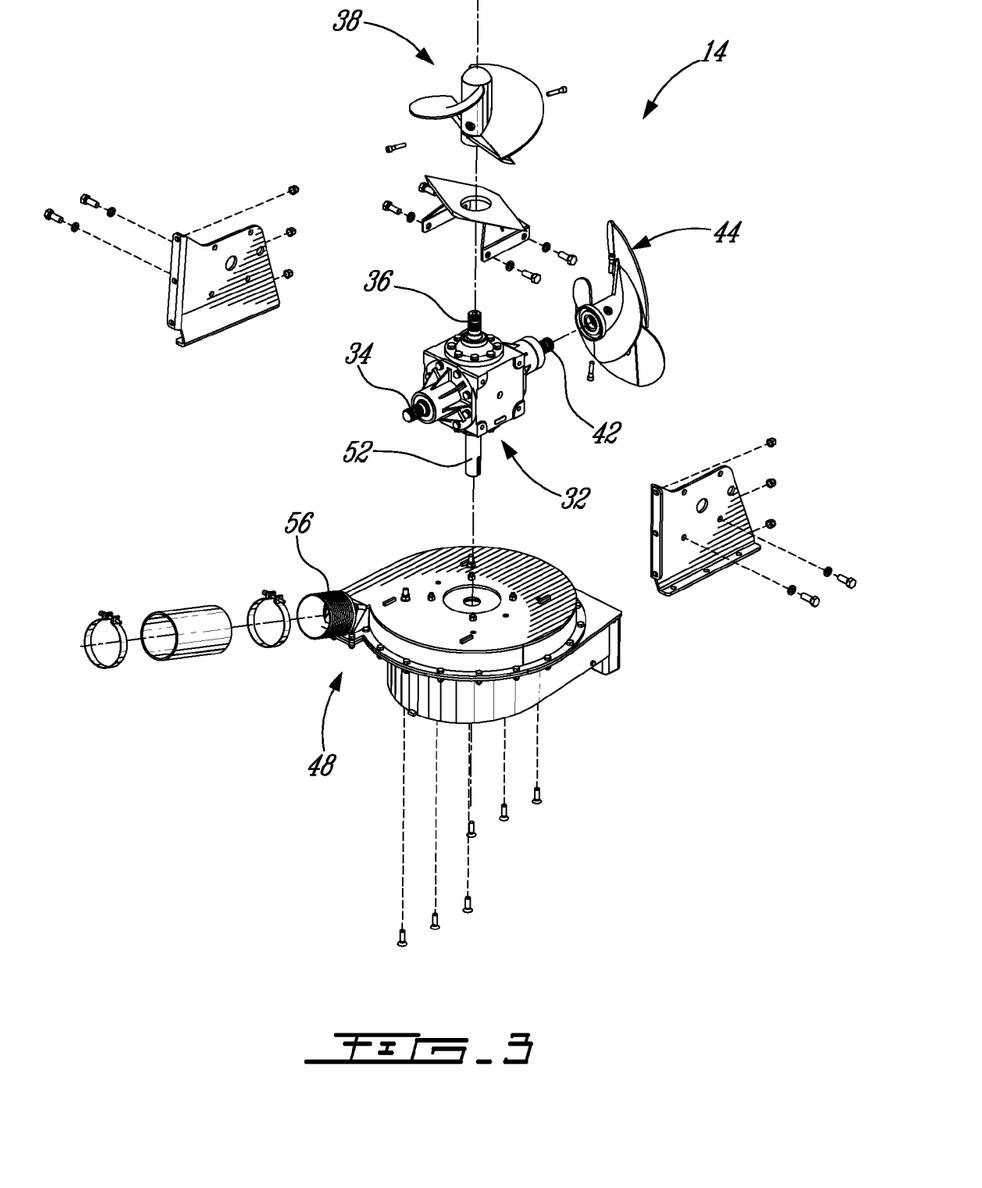
FIG. 3 is an exploded view of the pump unit shown in FIG. 2.

FIGS. 2 to 4 show the construction and the operation of the pump unit 14. Referring more particularly to FIG. 3, it can be appreciated that the pump unit 14 may comprise a gear box 32 including an input shaft 34 drivingly interconnected to three output shafts via a set of gears (not shown). The gearbox 32 has top and bottom faces and four lateral faces therebetween. The input shaft 34 projects from a first one of the lateral faces for connection to the drive shaft (not shown) extending through the central beam 22 of the apparatus 10. The first output shaft 36 projects upwardly from the top face of the gearbox 32. A first bladed rotor 38 is mounted to the first output shaft 36 for drawings solids downwardly against the pump unit 14, as depicted by arrows 40 in FIGS. 2 and 4. The bladed rotor 38 is exemplified as a multi-bladed propeller but it is understood that it could take any suitable form. For instance, the bladed rotor 38 could be provided in the form of spiral screw pump. The second output shaft 42 projects from a second lateral face of the gearbox 32. In the illustrated embodiment, the second output shaft 42 is set at 90 degrees to the first output shaft 36 and is axially aligned with the input shaft 34. However, it is understood that the second output shaft 42 could extend from another one of the lateral faces so as to have an orientation which is generally transversal to the input shaft 34. Also, it is understood that the second output shaft 42 could extend at an angle other than 90 degrees from the first output shaft 36, the illustrated embodiment being only one example of the invention. A second bladed rotor 44 is securely mounted to the second output shaft 42 for rotation therewith. The second bladed rotor could take any suitable form to create a flow of slurry.

While the first bladed rotor 38 is configured to draw solid particles downwardly towards the pump unit 14, the second bladed rotor 44 is configured to expel, eject or propel at least a portion of the solids drawn by the first bladed rotor 38 away from the pump unit 14, as depicted by arrows 46 in FIGS. 2 and 4. As will be discussed further herein below, this combination of drawing and expelling actions provides for a more effective mixing of the manure slurry.

An impeller housing 48 is mounted to the bottom face of the gearbox 32 for housing a third bladed rotor 50 (FIG. 4) mounted to the third output shaft 52 for rotation therewith.

The third bladed rotor 50 may comprise an impeller and a multi-bladed cutting wheel at the bottom end of shaft 52 for cutting/pulverizing solids before they be impelled into the impeller housing 48, as for instance disclosed in U.S. Pat. No. 5,100,303. As depicted by arrows 54 in FIGS. 2 and 4, the third bladed rotor 50 is configured to draw liquids upwardly from the bottom of the manure pit P. The impeller housing 48 has an outlet port 56 which is connected to a discharge pipe 58, which as will be seen herein below, is adapted to be displaced/aligned in straight pipe flow communication with either one of pipes 16 and 18 (the flow is not diverted to one of the pipes but rather selectively coaxially positioned in exact correspondence with pipes 16 or 18).

In addition of promoting better mixing, the expelling/propelling action of the second bladed rotor 44 on the solid particles drawn by first bladed rotors 38 contributes to prevent the pump from becoming clogged as a result of a too important flow of solid particles in relation to the flow of liquid being pumped by the third bladed rotor 50. The second bladed rotor 44 allows controlling the proportion of solids and liquids being drawn towards the pump unit 14 by the first and third bladed rotors 38 and 50. The ratio of solids and liquids being pumped can thus be better control to provide for the formation of a more "flowable" manure slurry.

The combination of three bladed rotors, a first one for drawing solids, a second one for drawing liquids and a third one for redirecting a portion of the flow of solids drawn by the first bladed rotor contributes to prevent the pump unit from becoming clogged due to an excess flow of solids as compared to the liquid flow. It also promotes better and faster mixing of the solids and liquids into a more "pumpable" slurry. With the simultaneous impelling and expelling actions on the slurry, the mixing operation can be performed much faster as compared to dual impeller type apparatus.

FIG. 5 illustrates an example of a flow distribution unit which may be used to selectively align the discharge pipe 58 with a selected one of the drainage pipe 16 and the re-circulation pipe 18. The distribution unit may generally comprise a support 60 adapted to be fixedly mounted to the frame 12 and a distribution plate 62 movable with respect to the support 60 for physically positioning the outlet end of the discharge pipe 58 in direct axial alignment with the inlet of either the drainage pipe 16 or the recirculation pipe 18 on the support 60. The distribution plate 62 may take the form of a pivot plate mounted for clockwise and counter clockwise rotation on a front face of the support 60. The plate 62 has a pipe connector 64 extending from one face thereof opposite the support 60 for connection to the discharge pipe 58. The support 60 has first and second pipe connections 66 and 68 extending from the back thereof for connection with pipes 16 and 18, respectively, Accordingly, by rotating the pivot plate 62 relative to the support 68, it is possible to selectively align the discharge pipe 58 with the inlet of either one of pipes 16 and 18.

Figure 6:
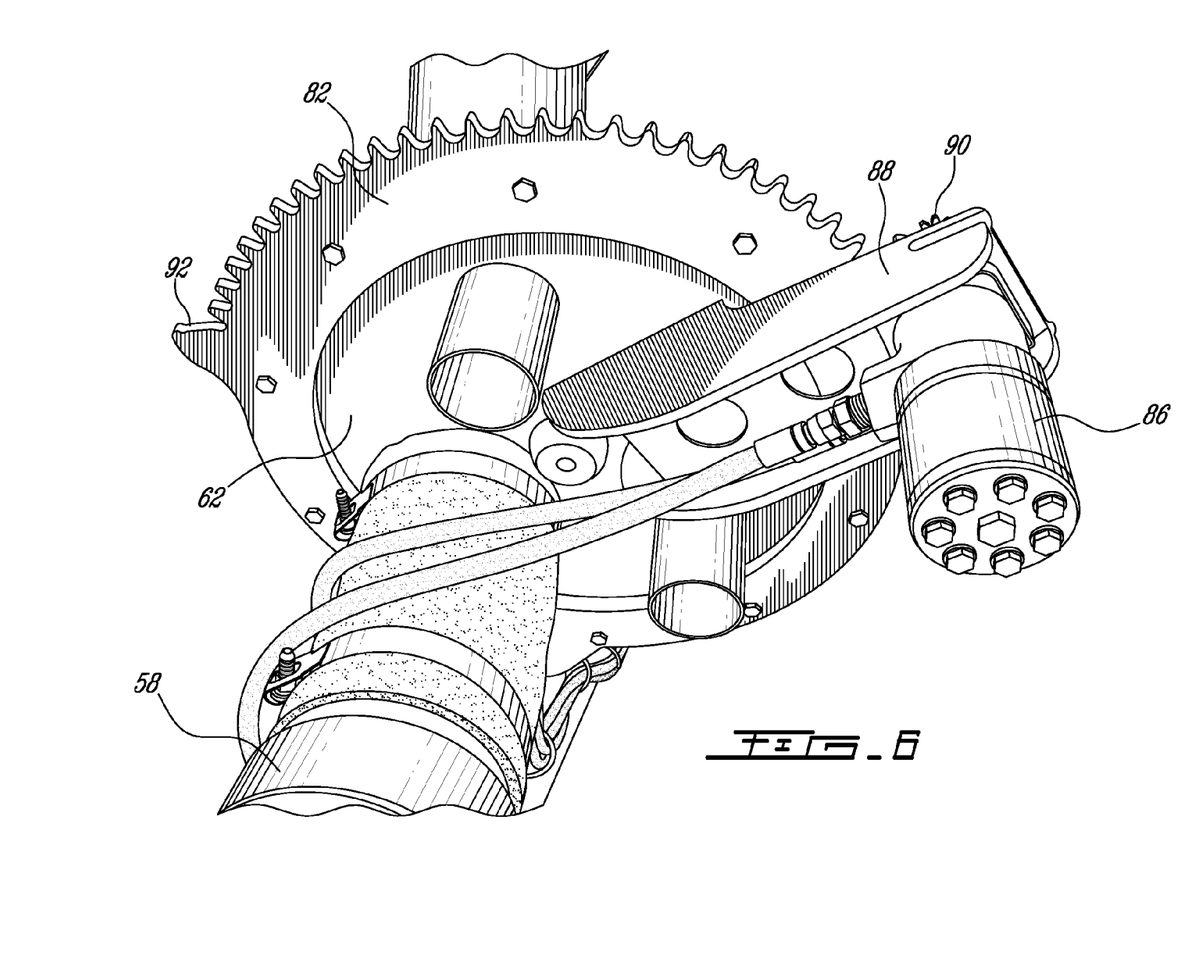
FIG. 6 is an enlarged view showing details of the flow distribution units.

More particularly, the plate 62 is mounted for rotation on a central axle 70 projecting from the front face of the support 60. A bushing 72 may be provided between the pivot plate 62 and the axle 70 for allowing free rotation of the plate 62 on the axle 70. A skid plate or disc 74 made of a low friction material, such as nylon, may be provided between the pivot plate 62 and the front face of the support 60 to reduce the friction therebetween. The skid plate 74 may be bolted at a periphery thereof to the front face of the support 60. The skid plate 74 has two holes 76 and 78 defined therethrough for alignment with the pipe inlet holes of pipe connections 66 and 68 of the support 60. An annular spacer 80 may be mounted over the skid plate 74 and bolted to the front face of the support 60 for surrounding/encircling the circular pivot plate 62. The annular spacer 80 may be provided in the form of two half-ring segments. The pivot plate 62 is trapped between the skid plate 74 and an externally toothed ring 82 bolted to the support 60. A segmented skid ring 84 may be provided between the pivot plate 62 and the externally toothed ring 82 to reduce the friction therebetween. An actuator, such as a hydraulic motor 86, is mounted to a pair of L-shaped brackets 88 extending from the back face of the pivot plate 62. As can be more clearly appreciated from FIG. 6, the brackets 88 extend radially outwardly from the periphery of the pivot plate to position the motor 86 radially outside of the outer circumference of the externally toothed ring 82. The motor 86 drives a pinion 90 which is in meshing engagement with the external teeth of ring 82. A pair of circumferentially spaced-apart stoppers 92 are provided on the externally toothed ring 82 to limit the rotational movement of the pivot plate 62 relative to the support 60 between first and second positions in which the pipe connector 64 of pivot plate 62 is respectively aligned in registry with the inlet holes of pipe connectors 66 and 68 on the support 60. It is understood that the pinion 90 could be disposed to engage an internally toothed ring as opposed to the externally toothed ring 82. For instance, the spacer ring 80 could be provided with teeth on its interior circumference. Any other suitable actuator arrangement is contemplated as well. For instance, a hydraulic cylinder could be used to pivot plate 62 on the axle 70.

In operation, the motor 86 can be powered to selectively rotate the pivot plate 62 in a clockwise or a counterclockwise direction in order to directly align the inlet pipe connection 64 with a selected one of the outlet pipe connections 66 and 68 of the support 60.

This is advantageous over a valve arrangement in that the flow of manure slurry is not diverted to a selected one of pipes 16 and 18 but rather directed in a "straight-through flow" fashion to pipes 16 and 18. The flow is not deviated but rather directly aligned with the selected conduit. Flow restriction resulting from flow deviation is thus avoided.

FIG. 7 shows the apparatus 10 in operation in a manure pit P. It can be appreciated that the wheeled sub-frame 24 pivots relative to the central beam 22 of the frame 12 to permit lowering and movement of the pump unit 14 in the manure pit P. Once in position, the pump unit 14 is actuated by means of the drive shaft extending through the beam 22. The drive shaft is connected to the power take-off of the tractor V so that all three bladed rotors 38, 44 and 50 of the pump unit 14 are rotated. The rotation of the first bladed rotor 38 forces a downward flow of fluid entraining crust sections and causing the crust to break up at the surface of the slurry in the vicinity of the pump unit 14. A portion of the downward flow caused by the first bladed rotor 38 is diverted away from the pump unit 14 by the second bladed rotor 44. At the same time, the third bladed rotor 50 draws liquid from the bottom of the manure pit P. The liquid drawn by rotor 50 mixes with the non-diverted portion of the solids drawn by the first bladed rotor 38 to form a pumpable slurry therewith. The combine actions of the three bladed rotors 38, 44 and 50 enhances the mixing of the slurry and shorten the time necessary for complete mixing thereof allowing the mixture or slurry to be pumped from the open pit or reservoir much more quickly. The pumpable slurry is pumped by the third bladed rotor 50 into the impeller housing 48 and then discharged therefrom via the discharge pipe 58. At the beginning of an operation, that is during the mixing phase of the process, the discharge pipe 58 is positioned in directed axial alignment with the recirculation pipe 18 (i.e. the outlet end of the discharge pipe 58 is in registry with the inlet end of the recirculation pipe 18) for directing the liquid/slurry back into the manure pit via nozzle 20. The nozzle 20 can be oriented so as to direct a jet of liquid/slurry against the crust formed at the surface of the pit to help breaking the crust. Once a suitable consistency is reached, the pivot plate 62 is pivoted to align the outlet end (i.e. the pipe connection 64) of the discharge pipe 58 with the inlet 66 of the drainage pipe 16 and the slurry is pumped by the third rotor 50 to provide a straight-through flow of manure slurry through the discharge pipe 58 and the drainage pipe 16. The drainage pipe 16 can be connected to storage tank of a spreader for subsequently spreading the collected manure slurry on a field.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

What is claimed is:

1. An apparatus for mixing and pumping manure slurry from a manure pit, the apparatus comprising: a pump unit adapted to be positioned within the manure pit, the pump unit having top, bottom and lateral faces; a first bladed rotor projecting from said top face of the pump unit for creating a downward flow of slurry and drawing solids downwardly against the pump unit; a second bladed rotor provided on the bottom face of the pump unit for drawing liquids upwardly from a bottom portion of the manure pit; and a third bladed rotor projecting from one of the lateral faces of the pump unit between the top and bottom faces thereof for redirecting a portion of the flow of solids drawn by the first bladed rotor away from the pump unit.

2. The apparatus defined in claim 1, wherein the second bladed rotor is mounted inside a housing having an inlet for receiving a flow of manure slurry, the housing having an outlet connected in fluid flow communication with a discharge pipe for discharging the manure slurry from the housing, the discharge pipe having a discharge end selectively positionable in alignment with a first inlet end of a drainage pipe or a second inlet end of a re-circulation pipe to provide for straight non-diverted flow of manure slurry to both the drainage and the re-circulation pipes.

3. The apparatus defined in claim 2, wherein the discharge end of the discharge pipe is connected to a first pipe connection provided on a distribution plate mounted for movement on a face of a support having second and third pipe connections respectively connected to said drainage pipe and said re-circulation pipe, and wherein an actuator is provided for displacing said distribution plate between a first position in which the first pipe connection is positioned in registry with the second pipe connection and a second position in which the first pipe connection is positioned in registry with the third pipe connection.

4. The apparatus defined in claim 3, wherein the distribution plate is rotatably mounted on an axle projecting from the face of the support, the actuator rotating the distribution on the axle between said first and second positions.

5. The apparatus defined in claim 4, wherein the actuator comprises a motor mounted on the distribution plate and driving a pinion mounted in meshing engagement with a set of teeth on the support.

6. The apparatus defined in claim 4, wherein the distribution plate is surrounded by a spacer ring which is fixed relative to the support.

7. The apparatus defined in claim 3, wherein a skid plate is mounted between the support and the distribution plate.

8. The apparatus defined in claim 1, wherein the third bladed rotor extends at substantially right angles from the first bladed rotor.

9. The apparatus defined in claim 8, wherein the third bladed rotor project from a front lateral face of the pump unit.

10. The apparatus defined in claim 1, wherein the pump unit comprises a gearbox having one input shaft and three output shafts for respectively driving the first, second and third bladed rotors.

* * * * *